UNITED STATES PATENT OFFICE.

FRANZ A. RODY, OF NEWARK, NEW JERSEY, ASSIGNOR TO METALLURGICAL COMPANY OF AMERICA, OF NEW YORK, N. Y., A CORPORATION OF NEW JERSEY.

METHOD OF OBTAINING ALKALIS FROM SILICATE-ROCK AND OTHER SILICATES.

1,260,944.     Specification of Letters Patent.     Patented Mar. 26, 1918.

No Drawing.     Application filed May 18, 1915. Serial No. 28,892.

*To all whom it may concern:*

Be it known that I, FRANZ A. RODY, a subject of the Emperor of Germany, residing at and whose post-office address is No. 258 Van Buren street, Newark, county of Essex, State of New Jersey, have invented certain new and useful Improvements in Methods of Obtaining Alkalis from Silicate-Rock and other Silicates; and I do hereby declare the following to be a full, clear, and exact description of the invention, such as will enable others skilled in the art to which it appertains to make and use the same.

The present invention relates to a method of obtaining alkalis from leucite rock and deals particularly with the digesting of the rock under pressure with an oxid of an alkali-earth metal. It has heretofore been proposed to digest finely ground silicates under pressure with oxids of calcium and magnesium, but the amounts of potash and soda rendered soluble are not as large as desired and it was found necessary to carry on the digesting operation for a considerable period of time.

My invention is based upon the discovery that if the leucite rock is first fused and finely ground, much better results are obtainable. In making tests, under conditions that were comparative in every way, I have found that I could obtain at a very much lower pressure than that heretofore proposed a yield practically equal to that heretofore obtained at higher pressures, and at a fraction of the time heretofore required, provided that the leucite was first fused and finely ground. Thus, in one instance, I digested 100 parts of previously fused leucite with six parts of lime for 1 hour at a pressure of 100 pounds per square inch and obtained 60% of the alkalis in solution. I then digested 100 parts of unfused crude leucite with 40 parts of lime, in sufficient water to make it liquid, at a pressure of from 250–285 pounds to the square inch for 24 hours and obtained 65% of the alkalis in solution.

It is thus apparent that by my present invention substantially 24 times the quantity of material can be treated with the same equipment and at a materially lower pressure. Moreover, as the pressure required is 60% less, and only about ⅛ of the reagent is needed, the slightly reduced yield is of little consequence as compared with the other advantages of the invention.

In carrying the invention into practice, the leucite rock (for instance the natural rock containing leucite found in the State of Wyoming and which likewise contains other minerals as well as free silica in varying amounts) is first heated to a high temperature until it melts to a sticky glass-like mass. An examination of this product will show that the original material has been greatly changed, it being impossible to distinguish any of the original minerals. The product has the appearance of a homogeneous mass and the action of acids and other reagents upon it is different from their action upon the original unsintered rock.

The fused rock is then finely ground and mixed with a small quantity of lime and digested for a short period of time under moderate temperatures. Inasmuch as lime $(Ca(OH)_2)$ is but slightly soluble in water, the solution carries, of course, such lime, both in solution and in suspension. For instance, a quantity of crude leucite rock about ¼ inch size was heated in the furnace to about 1100° C., whereupon it fused to a glassy mass. This mass was permitted to cool and was then crushed to 100 mesh, and 100 grams were mixed with 6 grams of lime and water to make it liquid. It was digested for 1 hour at 100 pounds per square inch pressure, whereupon 60% of the potash and soda in the ore was extracted.

It will be noted that in carrying out my improved process I usually add just sufficient lime to replace the potash and soda in the ore. In some instances, however, I may add an excess, in amount as much as 10 to 12% of the weight of the material, but even this amount is far below that which is necessary with the unfused or crude rock.

I do not wish to be limited to the proportions mentioned in the specific instances hereinbefore given, as I find that satisfactory results may be obtained even though the proportions may show considerable variation. The characteristic feature of the invention, and the one which I desire to particularly emphasize is that a fusion of the crude naturally occurring silicates brings about chemical changes which facilitate the extraction of the alkalis on digesting the silicates in the alkaline-earth metal oxid solutions; and that, with the same digester equipment, 24 times the amount of material can be treated, with a great reduction in the quantity of reagent employed, and at a steam pressure 60% less than in the former practice.

What I claim is:

1. The method of recovering alkalis from leucite, feldspar, and like silicates containing them, which comprises fusing the silicate and then digesting it in the presence of an alkaline-earth metal oxid, thereby freeing the alkalis in water-soluble form; substantially as described.

2. The method of recovering alkalis from leucite, feldspar, and like silicates containing them, which comprises fusing the silicate and digesting in a solution carrying, both in solution and in suspension, an oxid of an alkaline-earth metal, thereby freeing the alkalis in water-soluble form; subtantially as described.

3. The method of recovering alkalis from leucite, feldspar and like silicates containing them, which comprises fusing crude leucite, carrying free silica and foreign rock matter, to a glass-like stringy mass, and then heating and digesting it under pressure with milk of lime, thereby liberating the alkalis in water soluble form; substantially as described.

4. The method of recovering alkalis from leucite, feldspar and like silicates containing them, which comprises fusing leucite accompanied by free silica and associated rock matter, to a glass-like stringy mass, reducing it to powder, heating and digesting under pressure with milk of lime, thereby dissolving out the alkalis in form of hydroxids, and then filtering and obtaining the potash by evaporating the solution; substantially as described.

5. The method of recovering alkalis from leucite, feldspar and like silicates containing them, which comprises fusing about one hundred parts of crude leucite, reducing it to a powder of one hundred mesh and then digesting for about an hour with water and about six parts of lime at a pressure of one hundred pounds per square inch, thereby bringing the alkalis into solution; substantially as described.

In testimony whereof I affix my signature, in presence of two witnesses.

FRANZ A. RODY.

Witnesses:
H. M. BURKEY,
JEROME S. KATZ.